United States Patent [19]

Gatzmanga et al.

[11] Patent Number: 5,569,859
[45] Date of Patent: Oct. 29, 1996

[54] VORTEX FLOW SENSOR WITH A DRAG BODY

[75] Inventors: Heinz Gatzmanga, Köthen; Andreas Breier, Dessau, both of Germany

[73] Assignee: Endress & Hauser Flowtec AG, Reinach, Switzerland

[21] Appl. No.: 361,942

[22] Filed: Dec. 22, 1994

[30] Foreign Application Priority Data

Dec. 28, 1993 [DE] Germany ............... 43 44 747.3

[51] Int. Cl.⁶ .................................................. G01F 1/32
[52] U.S. Cl. ................................................... 73/861.22
[58] Field of Search ......................... 73/861.22, 861.24

[56] References Cited

U.S. PATENT DOCUMENTS

| | | | |
|---|---|---|---|
| 3,572,117 | 3/1971 | Rodely | 73/861.22 |
| 3,948,097 | 4/1976 | Kurita | 73/861.22 |
| 3,972,232 | 8/1976 | Miller et al. | 73/861.24 |
| 4,220,046 | 9/1980 | Sqourakes | 73/861.22 |
| 4,285,247 | 8/1981 | Klobe | 73/861.24 |
| 4,441,372 | 4/1984 | Barnard | 73/861.22 |
| 4,485,679 | 12/1984 | Pitt et al. | 73/861.22 |
| 4,592,240 | 6/1986 | McHale et al. | 73/861.22 |
| 4,782,710 | 11/1988 | Naguma et al. | 73/861.22 |
| 4,862,750 | 9/1989 | Nice | 73/861.24 |

FOREIGN PATENT DOCUMENTS

| | | |
|---|---|---|
| 141352 | 4/1980 | Germany. |
| 3427464A1 | 2/1986 | Germany. |
| 246364A1 | 6/1987 | Germany. |
| 256367A1 | 5/1988 | Germany. |
| 3916056A1 | 11/1990 | Germany. |
| 1584353 | 2/1981 | United Kingdom. |
| 2102953 | 2/1983 | United Kingdom. |

*Primary Examiner*—Richard Chilcot
*Assistant Examiner*—Harshad Patel
*Attorney, Agent, or Firm*—Bose McKinney & Evans

[57] ABSTRACT

To create vortex flow sensors with an extended range of constant Strouhal number toward small Reynolds numbers, with a small variation of the vortex separation frequency, and with precise calculability of the Strouhal number in the range of a constant volumetric-flow-rate/vortex-separation-frequency ratio, a drag body is provided which is permanently connected with the internal wall of a fluid-conducting measuring tube of inside diameter D, or fixed in a frame set in the measuring tube, at diametrically opposed points, and which consists of an upstream-side flat trapezoidal part of length $l_1$, of base width $b_1$ on the upstream side, and of base width $b_2$ on the downstream side, and a wake part adjoining the trapezoidal part without a gap and having a cross section in the form of a triangle of length $l_2$ and base width $b_3$. The following dimensioning equations hold:

$$0.1 \leq b_1/D \leq 0.35;$$

$$0.6 \leq b_2/b_1 \leq 0.95;$$

$$0.1 \leq l_1/b_1 \leq 0.2;$$

$$0.75 \leq l_2/b_1 \leq 1.5;$$

$$0.5 \cdot b_2/b_1 \leq b_3/b_1 \leq b_2/b_1.$$

3 Claims, 1 Drawing Sheet

VORTEX FLOW SENSOR WITH A DRAG BODY

FIELD OF THE INVENTION

The present invention relates to vortex flow sensors with a drag body for measuring the volumetric flow rate of wall-bounded liquid, gas, or vapor flow streams on the Kármán vortex street principle, said media being hereinafter referred to as "fluids".

BACKGROUND OF THE INVENTION

If the drag body is disposed in the middle of the fluid flow stream, vortices are alternately shed, i.e., separated, from both lateral edges of the drag body. The frequency of the vortex shedding, the so-called vortex separation frequency, is proportional to the velocity of flow, and thus—for wall-bounded fluid flows—proportional to the volumetric flow rate.

The measurement accuracy of the flow sensor is essentially dependent on the drag body, particularly on its shape, its dimensions, and its mounting point. Also dependent on these factors are that range of the Reynolds number Re in which the ratio of vortex separation frequency to volumetric flow rate is constant and which generally forms the measuring range of the vortex flow sensor, and the variation of the vortex separation frequency, which influences the measurement accuracy.

Prior art vortex flow sensors use simple basic shapes of the drag body, such as cylinder, rectangle, triangle, trapezoid, with trapezoidal drag bodies being frequently employed.

With such shapes of the drag body, however, a range of constant Strouhal number can only be achieved for Reynolds numbers Re$\geq$20,000, related to the diameter of the measuring tube; also, the variation of the Strouhal number is above 1%.

The Strouhal number S, as is well known, gives the relation between vortex separation frequency f and flow velocity v for a given width b of the drag body: S=fb/v.

with the above drag body shapes, the following values are reached, within optimum limits of measurement, for the lower limit $Re_{min}$ of the Reynolds number, and thus for the lower limit of the measuring range, as well as for the variation o of the vortex separation frequency f:

| Shape of drag body | $Re_{min}$ | σ/% |
|---|---|---|
| Circle | 40,000 | 4.0 |
| Rectangle | 25,000 | 3.0 |
| Triangle, upstream side flat | 21,000 | 1.5 |
| Triangle, upstream side pointed | 28,000 | 2.0 |
| Trapezoid | 25,000 | 1.0 |
| Narrow trapezoid | 20,000 | 2.0 |
| Rounded trapezoid | 25,000 | 3.0 |
| T body | 30,000 | 2.0 |
| Trapezoid/trapezoid | 20,000 | 2.5 |

In DE-A-39 16 056, only a drawing of the cross section of a drag body is shown (cf. FIG. 4 therein) without further explanation, said drag body being a combination body consisting of an upstream-side flat trapezoidal part of length $l_1$, of base width $b_1$ on the upstream side, and of base width $b_2$ on the downstream side, and a wake part adjoining the trapezoidal part without a gap and having a cross section in the form of a triangle of length $l_2$ and base width $b_3$, with the following dimensioning equations holding:

| | | | | | |
|---|---|---|---|---|---|
| | $b_2/b_1$ | = | 0.66 | | (2') |
| | $l_1/b_1$ | = | 0.20 | | (3') |
| | $l_1/b_1$ | = | 0.52 | | (4') |
| | $b_3/b_1$ | = | 0.19 | | (5') |
| 0.19 = | $b_3/b_1$ | $\leq$ | $b_2/b_1$ | = | 0.66 (5") |
| 0.33 = | $b_2/2b_1$ | $\geq$ | $b_3/b_1$ | = | 0.19 (5''') |

Also in common use are other combination bodies formed from the above basic shapes, which, if used in turbulent flow, however, give no appreciable increase in the range of constant Strouhal number or no reduction of the vortex separation frequency variation.

SUMMARY OF THE INVENTION

Accordingly, with the prior art drag bodies, a problem lies in the above limitation of the measuring range toward Reynolds numbers smaller than those mentioned and in the still too wide variation of the vortex separation frequency.

It is, therefore, an object of the invention to provide a vortex flow sensor which makes it possible to achieve an extended range of constant Strouhal number toward small Reynolds numbers and a small variation of the vortex separation frequency, and for which it is possible in the range of a constant volumetric-flow rate/vortex-separation-frequency ratio to calculate the Strouhal number from the dimensions of the drag body with an accuracy which is acceptable for measuring instruments.

The invention, which attains this object, therefore consists in the provision of a vortex flow sensor with a drag body which is permanently connected with the internal wall of a fluid-conducting measuring tube of inside diameter D, or fixed in a frame set in the measuring tube, at diametrically opposed points, and which is a combination body consisting of an upstream-side flat trapezoidal part of length $l_1$, of base width $b_1$ on the upstream side, and of base width $b_2$ on the downstream side, and a wake part adjoining the trapezoidal part without a gap and having a cross section in the form of a triangle of length $l_2$ and base width $b_3$, with the following dimensioning equations holding:

| | | | | | |
|---|---|---|---|---|---|
| | 0.1 | $\leq$ | $b_1/D$ | $\leq$ | 0.35 (1) |
| | 0.6 | $\leq$ | $b_2/b_1$ | $\leq$ | 0.95 (2) |
| | 0.1 | $\leq$ | $l_1/b_1$ | $\leq$ | 0.2 (3) |
| | 0.75 | $\leq$ | $l_2/b_1$ | $\leq$ | 1.5 (4) |
| 0.5 · | $b_2/b_1$ | $\leq$ | $b_3/b_1$ | $\leq$ | $b_2/b_1$ (5) |

In a preferred embodiment of the invention, a vortex frequency sensor is incorporated in the wake part, preferably in those sides of the wake part around which fluid flows, and level with the surface thereof.

In a further development of the invention, this preferred embodiment may be provided with a piezoelectric vibrator acting as the vortex frequency sensor, with the wake part being attached to the trapezoidal part in such a way that the vortices produce a movement of the wake part, as is already described per se in DD-A-256 367.

The wake part, which contains the side of the piezoelectric vibrator to be deflected, is so attached to the trapezoidal part that the piezoelectric vibrator responds to minimum deflections caused by the pressure variations along the vortex street and generates a corresponding electric voltage as the measurement signal to be processed.

Thus, in the invention, the drag body extends at the center of the tube along the entire tube or within the aforementioned frame, and it consists of two parts disposed one behind the other in the direction of flow and assembled centrosymmetrically without a gap between them. On the upstream side, use is made of a plane, narrow trapezoidal part which is firmly connected in a torsion-free manner with the tube or, in the case of large tube diameters, with a frame. The trapezoidal part, having a cross section tapering in the direction of flow and a limited length $l_1$, results in a fixed separation point of the flow.

If this trapezoidal part were used as the sole drag body, it would have a range of constant Strouhal number above Re=20,000 and a variation $\sigma<2\%$. The cause of this variation lies in the vortices forming alternately at the rear edge, which may influence each other already in the development stage and may thus result in irregular separation.

Therefore, the vortex flow sensor according to the invention includes a wake part which is joined to the rear edge of the trapezoidal part and whose cross section tapers uniformly in the direction of flow, i.e., forms a triangle. This continuous shape is responsible for mutually undisturbed vortex separation as it causes the vortices to form at the lateral edges of the wake part. Furthermore, when a defined vortex size is reached, a synchronization flow is obtained around the rear edge of the wake part, which stabilizes the alternate separation.

In the invention, the vortex separation frequency is dependent on the flow velocity or the volume rate of flow much more heavily than in the case of drag bodies with a flat rear edge, since the dimensioning prescribed according to the invention, i.e., the dimensioning according to the above Equations (1) to (5), results in the synchronization flow around the rear edge, which oscillates at the vortex frequency.

Thus, with regard to the problem of the extension of the linear measuring range and the increase in measurement accuracy, a considerably improved volumetric-flow-rate/vortex-separation-frequency characteristic is obtained.

To determine the Strouhal number for the drag body dimensioned according to the invention, a calculation model with improved accuracy can be provided which is based on the calculation of the vortex-forming area at the drag body, taking into account the three-dimensional flow profile and the change of the vortex geometry in the z-direction, which is determined by this profile. This equation for calculating the Strouhal number S is:

$$S=1.723 \cdot (b_1/D)^{1.29} \cdot \exp[-0.282 \cdot l_2(1-0.5 \cdot b_3/b_1)/b_1] \quad (6)$$

By this equation, the Strouhal number can be calculated to an accuracy of $\leq 2.5\%$.

The extension of the range of constant Strouhal number achieved by the invention, the reduction of the variation of the vortex separation frequency, and the possibility of calculating the Strouhal number extend the range of application of vortex flow sensors considerably.

BRIEF DESCRIPTION OF THE DRAWINGS

The invention will become more apparent from the following description of an embodiment when taken in conjunction with the accompanying drawing, in which.

DETAILED DESCRIPTION OF THE DRAWINGS

Figure 1A:
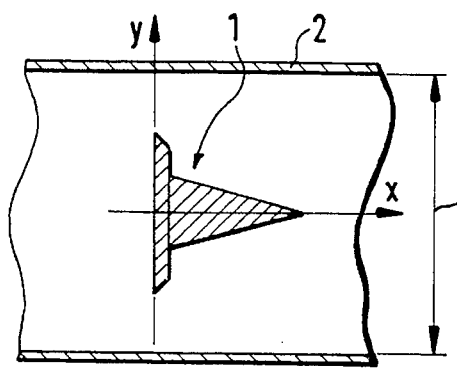
FIG. 1 shows a cross section of a drag body according to the invention and, schematically, its arrangement in the measuring tube.
Figure 1B:
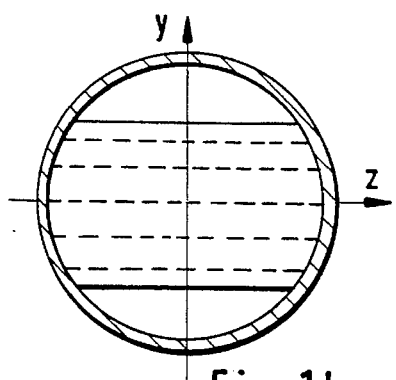

FIG. 1 illustrates the arrangement of a drag body 1 in a measuring tube 2, which has the inside diameter D. FIG. 1a shows the x-y plane, and FIG. 1b the y-z plane. It can be seen that the height of the drag body (=dimension in the direction of the z-axis) is chosen so that tube wall and drag body touch without a gap between them.

In the case of tube diameters D>100 mm, the drag body is preferably so disposed in a frame that the head and foot sides of the drag body end at the frame gap-free. This frame structure must be completely disposed in the fluid stream.

Figure 2:
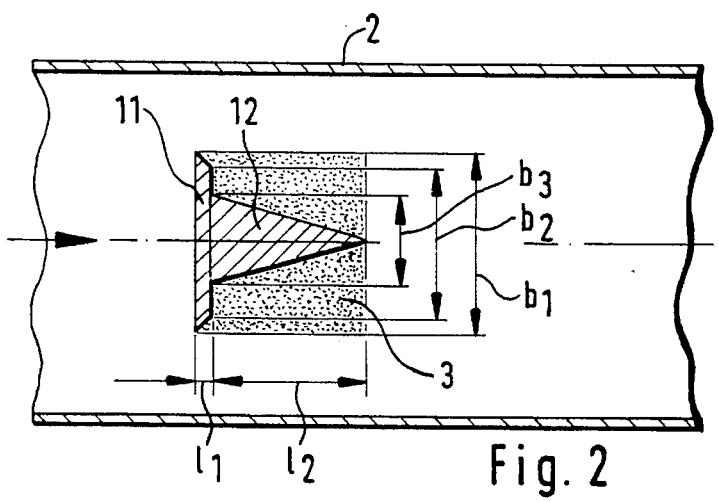
FIG. 2 shows geometrical defining quantities of the drag body.
Figure 3:
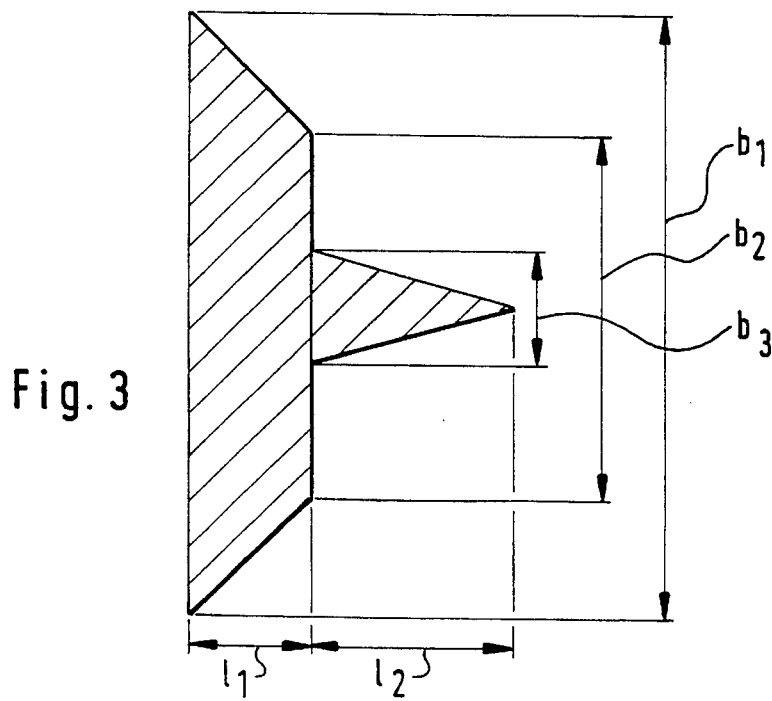
FIG. 3 shows a cross section of the prior art drag body referred to above.

FIG. 2 shows the drag body 1, consisting of a trapezoidal part 11 and a wake part 12 of triangular section, and its geometrical defining quantities: length $l_1$ of the trapezoidal part 11, length $l_2$ of the triangle, upstream-side base width $b_1$ of the trapezoidal part, downstream-side base width $b_2$ of the trapezoidal part, and base width $b_3$ of the triangle.

If these dimensions are chosen to lie within the limits of the above equations, in fully developed turbulent flow with an axisymmetric flow profile, a range of constant Strouhal number will be obtained over a Reynolds-number range of 7,500<Re<350,000. In this range, the turbulence-induced variation of the vortex separation frequency is <0.75%.

The dotted areas 3 in FIG. 2 are the vortex-forming areas on which the above calculation of the Strouhal number is based.

What is claimed is:

1. A vortex flow sensor for use in a fluid-conducting measuring tube of inside diameter D, the vortex flow sensor comprising a drag body adapted to be at least one of permanently connected to an internal wall of a fluid-conducting measuring tube and fixed in a frame set in the measuring tube, the drag body including an upstream side, a downstream side, an upstream-side flat trapezoidal part of length $l_1$, a base width $b_1$ on the upstream side, and base width $b_2$ on the downstream side, and a wake part adjoining the trapezoidal part without a gap and having a cross section in the form of a triangle of length $l_2$ and base width $b_3$, wherein $0.1 \leq b_1/D \leq 0.35$, $0.6 \leq b_2/b_1 \leq 0.95$, $0.1 \leq l_1/b_1 \leq 0.2$, $0.75 \leq l_2/b_1 \leq 1.5$, and $0.5 b_2/b_1 \leq b_3/b_1 \leq b_2/b_1$.

2. A vortex flow sensor for use in a fluid-conducting measuring tube of inside diameter D, the vortex flow sensor comprising a drag body adapted to be fixed within a fluid-conducting measuring tube, the drag body including an upstream side, a downstream side, an upstream-side flat trapezoidal part of length $l_1$, a base width $b_1$ on the upstream side, a base width $b_2$ on the downstream side, and a wake part adjoining the trapezoidal part without a gap and having a cross section in the form of a triangle of length $l_2$ and base width $b_1$, wherein $0.1 \leq b_1/D \leq 0.35$, $0.6 \leq b_2/b_1 \leq 0.95$, $0.1 \leq l_1/b_1 \leq 0.2$, $0.75 \leq l_2/b_1 \leq 1.5$, and $0.5 b_2/b_1 \leq b_3/b_1 \leq b_2/b_1$ to provide a constant Strouhal number in a fully developed turbulent flow.

3. The vortex flow sensor of claim 2, wherein the values of l1, l2, b1, b2, and b3 are selected to provide a range of constant Strouhal number over a Reynolds-number range of $7,500 < Re < 350,000$ in a fully developed turbulent flow with an axisymmetric flow profile.

* * * * *